Aug. 28, 1923.　　　　　　　　　　　　　　　　1,466,607
S. L. TRUEBLOOD
DIRECTION INDICATOR
Filed Aug. 11, 1922　　　　3 Sheets-Sheet 1

S. L. Trueblood
INVENTOR

Aug. 28, 1923.
S. L. TRUEBLOOD
DIRECTION INDICATOR
Filed Aug. 11, 1922
1,466,607
3 Sheets-Sheet 2
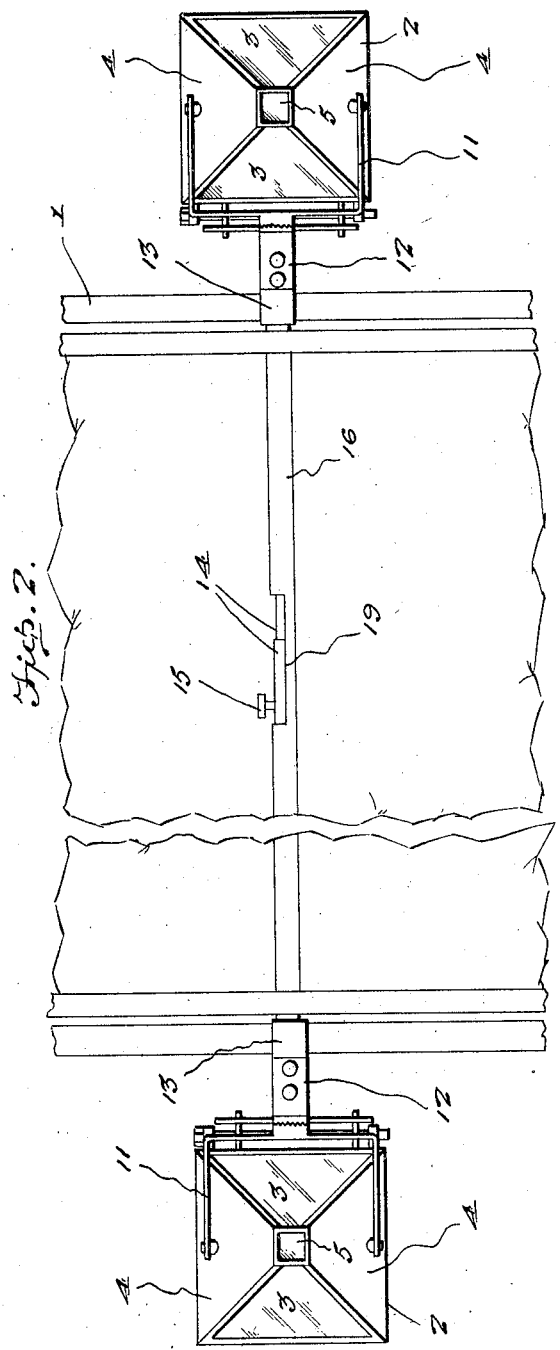
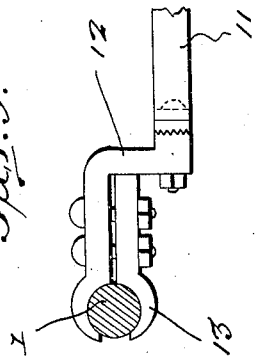
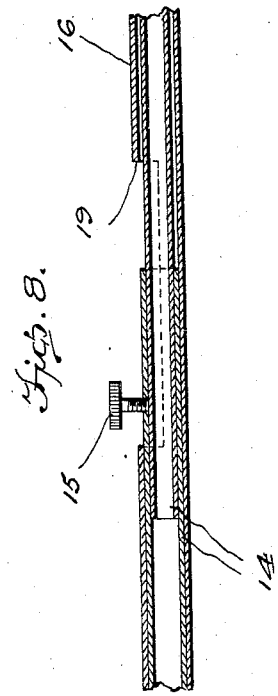
S. L. Trueblood
INVENTOR
BY Victor J. Evans
ATTORNEY
WITNESS:

Aug. 28, 1923.
S. L. TRUEBLOOD
1,466,607
DIRECTION INDICATOR
Filed Aug. 11, 1922
3 Sheets-Sheet 3
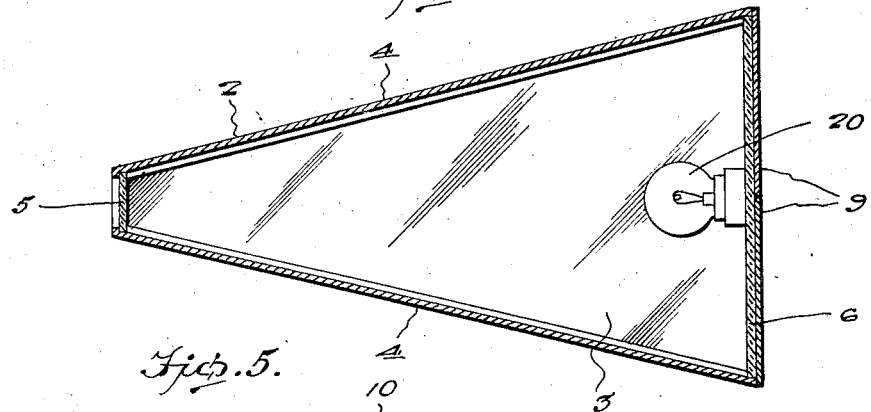
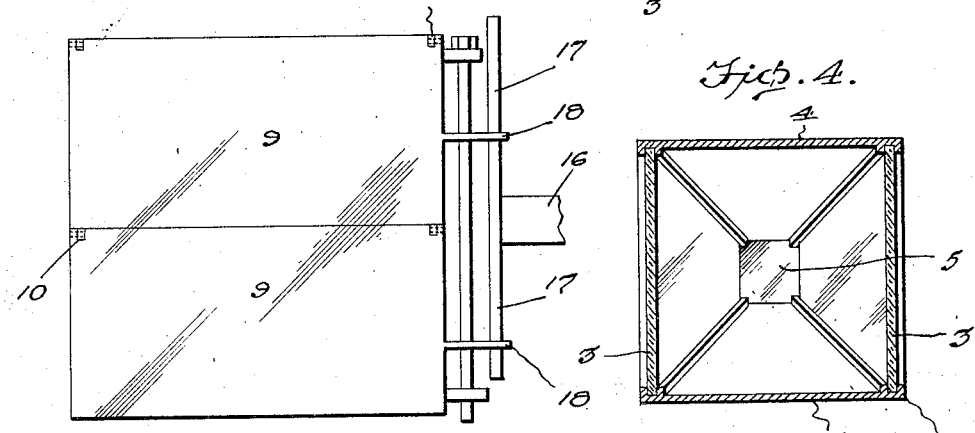
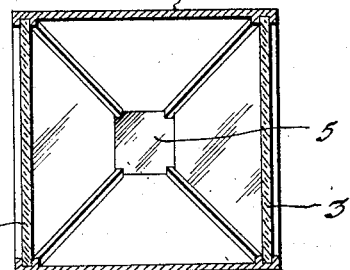
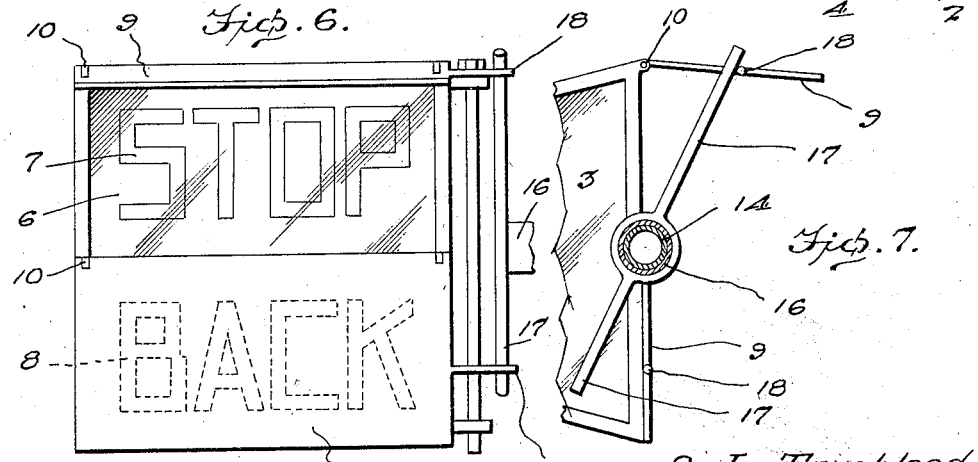
S. L. Trueblood INVENTOR
BY Victor J. Evans ATTORNEY
WITNESS:

Patented Aug. 28, 1923.

1,466,607

UNITED STATES PATENT OFFICE.

SAMUEL LEONARD TRUEBLOOD, OF BATON ROUGE, LOUISIANA.

DIRECTION INDICATOR.

Application filed August 11, 1922. Serial No. 581,234.

*To all whom it may concern:*

Be it known that I, SAMUEL L. TRUE-BLOOD, a citizen of the United States, residing at Baton Rouge, in the parish of East Baton Rouge and State of Louisiana, have invented new and useful Improvements in Direction Indicators, of which the following is a specification.

The object of this invention is to provide means for indicating to other drivers and pedestrians, the intentions of the driver of a motor vehicle as to the direction of travel.

Another object of the invention is to provide means for indicating when the driver intends to stop his vehicle or back it and to associate with such means a combined mirror and shutter, the mirror being used for enabling the driver to see the road in his rear.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 2 is a fragmentary view looking towards the front or outer face of the windshield.

Figure 3 is a longitudinal sectional view through one of the indicators.

Figure 4 is a transverse sectional view through the same.

Figure 5 is an end view showing the cover plates in closed position.

Figure 6 is a similar view with one of the cover plates in raised position.

Figure 7 is a fragmentary side view of Figure 6.

Figure 8 is a fragmentary sectional view through the operating means.

Figure 9 is a detail view of the clamping means.

Figure 1:
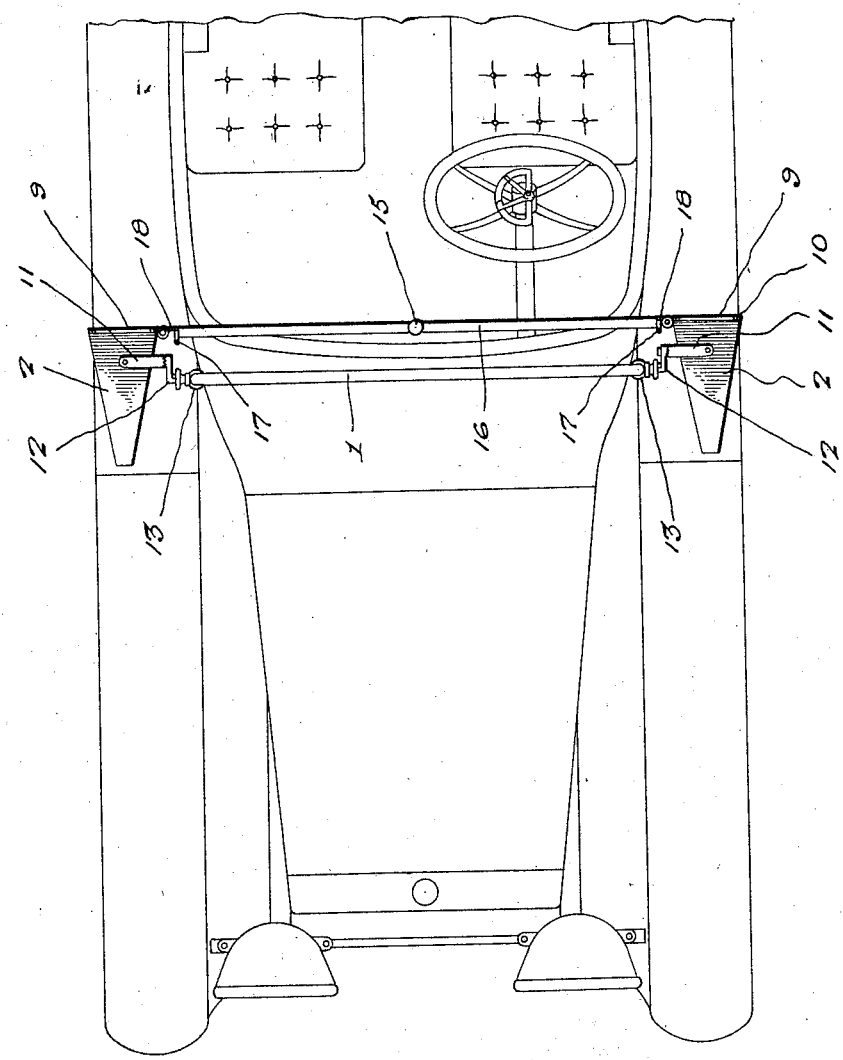
Figure 1 is a fragmentary plan view showing the invention in use upon an automobile.

In these views 1 indicates the windshield supporting frame and 2 designates a pair of indicators placed one at each side of the vehicle and each consisting of a tapered hollow body, the small end extending towards the front of the vehicle. The two sides of the body are preferably composed of transparent plates 3, colored red, and the top and bottom of sheet iron, as shown at 4. The small end is covered by a glass plate 5 which is uncolored and the back is also composed of transparent material, as shown at 6, one half of which bears the word "Stop", as shown at 7, and the other half the word "Back", as shown at 8. This rear end is adapted to be covered by a pair of plates 9 which are hingedly connected with the body at the upper edges, as shown at 10, so that they will remain in closed position, covering the transparent plate, by gravity. The front faces of the two hinged plates form a mirror so that the driver can observe the road in his rear. Each indicator is supported by a yoke frame 11, the extremities of the yoke being pivotally connected with the top and bottom of the body an appreciable distance from the rear end thereof. This yoke is adjustably secured to a bracket 12 which is provided with the clamping jaws 13 so that the bracket can be clamped to the windshield frame.

The means for swinging the indicators in the yoke frames consists of the telescopic members 14 which are pivotally connected with the rear ends of the indicators and are held in adjusted position by the clamping bolt 15. This arrangement of parts permits the device to be placed on automobiles, the windshield frames of which are of different lengths. It will be seen that by moving the telescopic members longitudinally one indicator will be moved outwardly and the other inwardly so as to point out the turn which the vehicle is to make. When the indicators are pointing straight ahead it will be understood that the vehicle is to travel straight ahead.

The means for swinging the sectional mirror to uncover the word stop or back when the driver intends to stop or back his vehicle consists of a tube 16 surrounding telescopic members and rotatably supported thereon and having rods 17 at its end for engaging projections 18 on the two parts of the mirror, these parts being so arranged that when the tube is rotated in one direction it will raise the upper half of the mirror and when rotating in the opposite direction it will raise the lower half of the mirror. The top is provided with a slot 19 through which the clamping screw 15 passes.

An electric lamp 20 is placed in each indicator and current is supplied to the lamp from any suitable source. In this way the indicator can be readily observed at night as well as during the day.

From the above it will be seen that the driver can readily indicate to pedestrians and other drivers the course he intends to take as the indicators will point out said course. By raising the sections of the mirror he can also inform drivers following him that he intends to stop or back.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A directional indicator comprising a pair of hollow bodies, each having its walls formed in part of transparent material, a lamp in said body, means for pivotally supporting said bodies one at each side of a motor vehicle, a mirror at the rear of each body, a directional sign at the rear of each body normally covered by said mirror, a member connecting the two bodies together so that they can be moved in unison and means associated with the said member for moving the mirrors off the signs.

2. A directional indicator comprising a hollow body of tapered shape having its wall formed in part of transparent material, a lamp in said boly, means for pivotally supporting said body, means for swinging said body upon its support to indicate the direction of travel, a mirror at the rear of the body, a directional sign at the rear normally covered by said mirror and means for moving said mirror off the sign.

3. A directional indicator comprising a hollow body of tapered shape, the side walls being formed of colored transparent material, the small front end of clear transparent material and the rear of transparent material, a sectional mirror covering the rear, said rear having sign words thereon normally covered by the mirror, a lamp in the body, means for moving the sectional mirror to uncover the words, means for pivotally supporting the body and means for moving the same to indicate the direction of travel.

In testimony whereof I affix my signature.

SAMUEL LEONARD TRUEBLOOD.